(12) United States Patent
Togashi

(10) Patent No.: US 6,707,053 B2
(45) Date of Patent: Mar. 16, 2004

(54) TILT DETECTOR

(75) Inventor: Mitsuhiro Togashi, Yokohama (JP)

(73) Assignee: Samsung Electro-Mechanics Co., Ltd., Kyunggi-Do (KR)

( * ) Notice: Subject to any disclaimer, the term of this patent is extended or adjusted under 35 U.S.C. 154(b) by 171 days.

(21) Appl. No.: 09/818,935

(22) Filed: Mar. 28, 2001

(65) Prior Publication Data

US 2001/0042846 A1 Nov. 22, 2001

(30) Foreign Application Priority Data

Mar. 28, 2000 (JP) .................................. 2000-089877

(51) Int. Cl.$^7$ .............................................. G01N 21/86
(52) U.S. Cl. ............................................ 250/559.37
(58) Field of Search ........................... 356/356, 400, 356/401, 399; 250/548–557, 561, 237 G, 231.13–231.18, 559.37; 355/53, 77

(56) References Cited

U.S. PATENT DOCUMENTS 5,461,237 A * 10/1995 Wakamoto et al. .......... 250/548
5,621,527 A * 4/1997 Kaneda et al. ............... 356/499

* cited by examiner

Primary Examiner—Tu T. Nguyen
(74) Attorney, Agent, or Firm—Morgan, Lewis & Bockius LLP

(57) ABSTRACT

A tilt detector for detecting a tilt amount of a recording surface of an optical disc at a high degree of precision. The tilt detector comprises a light emitting diode for emitting a divergent beam of light to be incident on the recording surface of the optical disc, a collimating lens for collimating the divergent beam of light emitted from the light emitting diode and directing the collimated beam of light onto the recording surface of the optical disc, a condensing lens for condensing the collimated beam of light from the collimating lens, directed onto the recording surface of the optical disc and then reflected from the recording surface, and a photodiode for receiving the collimated beam of light condensed by the condensing lens and detecting the centroid of the intensity of the received beam of light, the photodiode including a receiving surface partitioned into a plurality of areas for receiving the collimated beam of light condensed by the condensing lens.

3 Claims, 3 Drawing Sheets

TILT DETECTOR

BACKGROUND OF THE INVENTION

1. Field of the Invention

The present invention relates in general to an optical disc driver, and more particularly to a tilt detector for detecting a tilt of an optical axis of a beam of light, which is emitted by an optical pickup on a recording surface of an optical disc for the reading of information written on the recording surface, relative to the surface.

2. Description of the Prior Art

It is commonly required that an optical pickup should be improved in precision to meet requirements for a densification of an optical disc. In particular, it is currently required that an optical axis of a beam of light, which is emitted by the optical pickup on a recording surface of the optical disc for the reading of information written on the recording surface, that is, an optical axis of an object lens installed in the optical pickup should be perfectly perpendicular to the recording surface.

On the other hand, with the densification of the optical disc, the number of apertures (NA) of the object lens installed in the optical pickup increases and the beam of light emitted from the optical pickup has a shorter wavelength. As a result, a coma-aberration increases significantly due to a tilt of the optical axis of the beam of light emitted from the optical pickup relative to the recording surface of the optical disc, which leads to a keen need for detection of a tilt amount (for example, a tilted angle).

Particularly, provided that a liquid crystal device is used to correct the tilt on the basis of the detected tilt amount, an aberration will have to be generated to offset the tilt. In this regard, it is required to accurately detect and measure a tilt amount (for example, a tilted angle).

FIG. 9 shows the construction of a conventional tilt detector 102 for detecting a tilt amount (for example, a tilted angle). The tilt detector 102 is installed in an optical pickup, which generates a beam of light for the reading of information written on a recording surface of an optical disc 101. Separately from the beam of light generated by the optical pickup, a light emitting diode (LED) 103 emits a divergent beam of light on the recording surface of the optical disc 101. The divergent beam of light emitted from the LED 103 has an intensity of Gaussian distribution. A beam of light reflected from the recording surface of the optical disc 101 is received by a photodiode (PD) 106. The PD 106 is adapted to detect the centroid of the intensity of the received beam of light.

If the recording surface of the optical disc 101 is tilted as indicated by a broken line a in FIG. 9, the centroid of the intensity of a beam of light received on a receiving surface of the PD 106 moves accordingly. This centroid movement is detected by the PD 106, and a tilt amount is in turn detected on the basis of the detected centroid movement.

However, the above-mentioned conventional tilt detector has the following problem. That is, the centroid of the intensity of the beam of light received on the receiving surface of the PD 106 may move even with, for example, a variation in distance from the tilt detector 102 to the recording surface of the optical disc 101 due to a surface vibration of the disc 101, etc. In this case, the detected tilt amount value varies, thereby making it impossible to detect the tilt amount at a high degree of precision.

The above problem will hereinafter be described in detail referring again to FIG. 9. If the recording surface of the optical disc 1 is tilted as indicated by the broken line a, the centroid of the intensity of the beam of light on the receiving surface of the PD 106 moves beyond the LED 103. On the other hand, even when the recording surface of the optical disc 101 becomes more distant from a transmitting surface of the LED 103 and the receiving surface of the PD 106 as indicated by a broken line b, the centroid of the intensity of the beam of light on the receiving surface of the PD 106 moves beyond the LED 103.

SUMMARY OF THE INVENTION

Therefore, the present invention has been made in view of the above problem, and it is an object of the present invention to provide a tilt detector which is capable of detecting a tilt amount at a high degree of precision.

In accordance with the present invention, the above and other objects can be accomplished by the provision of a tilt detector for detecting a tilt of a recording surface of an optical disc, comprising light emitting means for emitting a divergent beam of light to be incident on the recording surface of the optical disc; a collimating lens for collimating the divergent beam of light emitted from the light emitting means and directing the collimated beam of light onto the recording surface of the optical disc; a condensing lens for condensing the collimated beam of light from the collimating lens, directed onto the recording surface of the optical disc and then reflected from the recording surface; and light receiving means for receiving the collimated beam of light condensed by the condensing lens and detecting the centroid of the intensity of the received beam of light, the light receiving means including a receiving surface partitioned into a plurality of areas for receiving the collimated beam of light condensed by the condensing lens.

Preferably, the collimating lens and condensing lens may constitute a single transmitting/receiving lens.

More preferably, the light emitting means and light receiving means may be arranged symmetrically on the basis of an optical axis of the transmitting/receiving lens.

As an alternative, the light emitting means and light receiving means may be arranged on the optical axis of the transmitting/receiving lens.

More preferably, the transmitting/receiving lens may have two centers of curvature.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
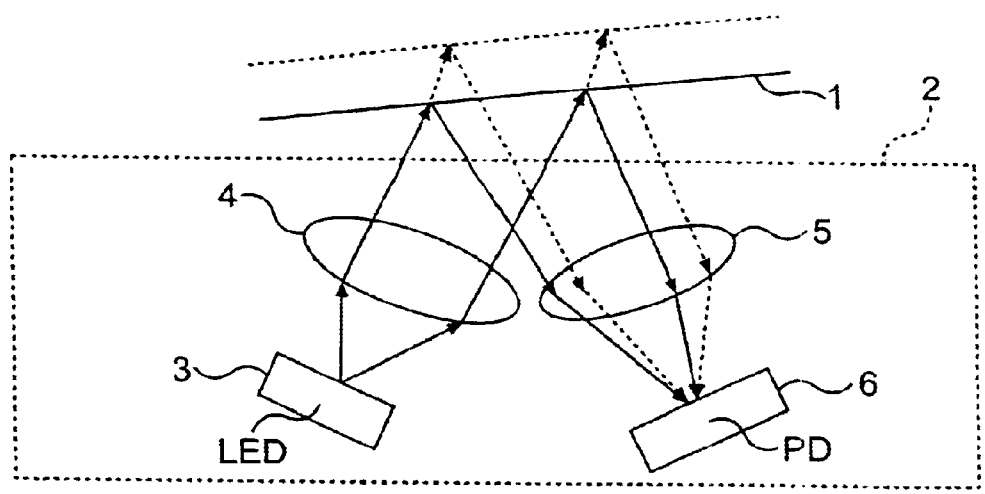
FIG. 1 is a view showing the construction of a tilt detector in accordance with a first embodiment of the present invention.

FIG. 1 is a view showing the construction of a tilt detector in accordance with a first embodiment of the present invention. In this drawing, the reference numeral 1 denotes an optical disc optically connected to the tilt detector of this invention, and the reference numeral 2 denotes the tilt detector of the present invention. The tilt detector 2 is adapted to detect the amount of a tilt of an optical axis of a beam of light, which is emitted by an optical pickup (not shown) on a recording surface of the optical disc 1 for the reading of information written on the recording surface, relative to the surface. This tilt detector 2 is fixedly mounted on the optical pickup.

The tilt detector 2 comprises a light emitting diode (LED) 3, collimating lens 4, condensing lens 5 and photodiode (PD) 6. The LED 3 emits a divergent beam of light to be incident on the recording surface of the optical disc 1. The divergent beam of light emitted from the LED 3 preferably has an intensity of Gaussian distribution. The collimating lens 4 collimates the divergent beam of light emitted from the LED 3 and directs the collimated beam of light onto the recording surface of the optical disc 1.

The directed beam of light is reflected from the recording surface of the optical disc 1 and then incident on the condensing lens 5. It should be noted that, because the beam of light directed onto the recording surface of the optical disc 1 is a collimated beam of light, the beam of light reflected from the recording surface is a collimated beam of light, also. The condensing lens 5 condenses the collimated beam of light reflected from the recording surface of the optical disc 1 on a receiving surface of the PD 6. The PD 6 is adapted to detect the centroid of the intensity of the condensed beam of light.

Figure 2:
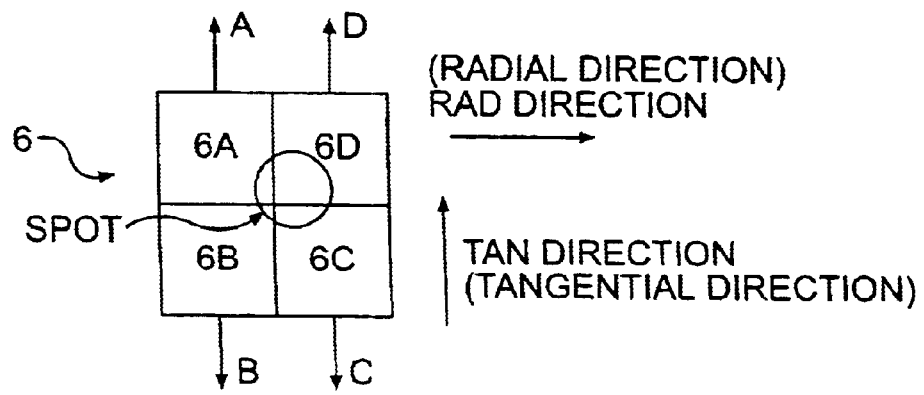
FIG. 2 is a plan view of a receiving surface of a photodiode in accordance with the first embodiment of the present invention.

FIG. 2 is a plan view of the receiving surface of the PD 6 in FIG. 1. As shown in this drawing, the receiving surface of the PD 6 is partitioned into a total of four areas 6A, 6B, 6C and 6D. Namely, the receiving surface of the PD 6 is divided in two in a radial direction (RAD direction) of the optical disc 1 and then in two in a tangential direction (TAN direction) of the circumference of the disc 1. The areas 6A, 6B, 6C and 6D output optical signals A, B, C and D corresponding to the amounts of light received thereby, respectively.

A detailed description will hereinafter be given of the operation of the tilt detector with the above-stated construction in accordance with the first embodiment of the present invention. If the recording surface of the optical disc 1 is tilted, the centroid of the intensity of a beam of light on the receiving surface of the PD 6 moves accordingly. This centroid movement is detected on the basis of the optical signals A, B, C and D emerging from the four areas 6A, 6B, 6C and 6D of the PD 6. In other words, the optical signals A, B, C and D from the four areas 6A, 6B, 6C and 6D are delivered to calculation means, not shorn, which then calculates a radial tilt amount and a tangential tilt amount on the basis of the below equations:

radial tilt amount=$(A+B)-(C+D)$  [Equation 1]

tangential tilt amount=$(A+D)-(B+C)$  [Equation 2]

Notably, even when the distance from the tilt detector 2 to the recording surface of the optical disc 1 varies, the centroid of the intensity of the beam of light on the receiving surface of the PD 6 does not move, resulting in no variation in the optical signals A, B, C and D. As a result, no error occurs in detected tilt amount even if the distance from the tilt detector 2 to the recording surface of the optical disc 1 varies due to a surface vibration of the disc 1, etc.

Figure 3:
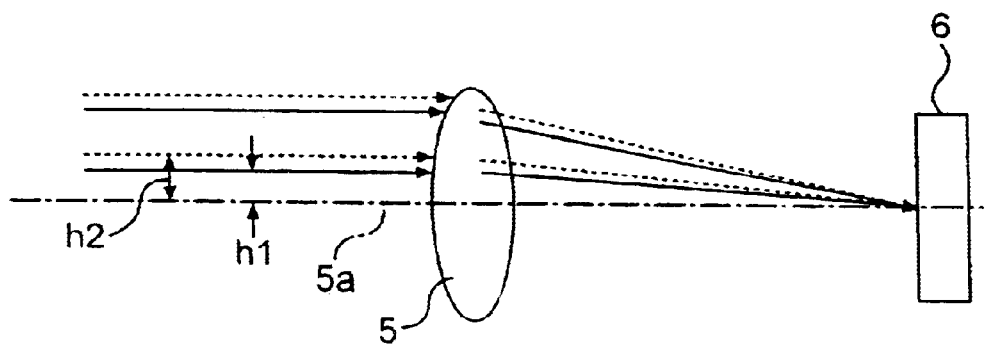
FIG. 3 is a view illustrating the principle of offsetting an effect resulting from a distance variation in accordance with the present invention.

The above principle will hereinafter be described in more detail with reference to FIG. 3. If the distance from the tilt detector 2 to the recording surface of the optical disc 1 varies, a height of a collimated beam of light incident on the condensing lens 5 relative to an optical axis 5a of the lens 5 varies accordingly. For example, the height of the collimated beam of light relative to the optical axis 5a of the condensing lens 5 may vary from h1 to h2. But, even when the height of the collimated beam of light relative to the optical axis 5a varies, a condensed position of that beam on the receiving surface of the PD 6 does not vary.

Figure 4:
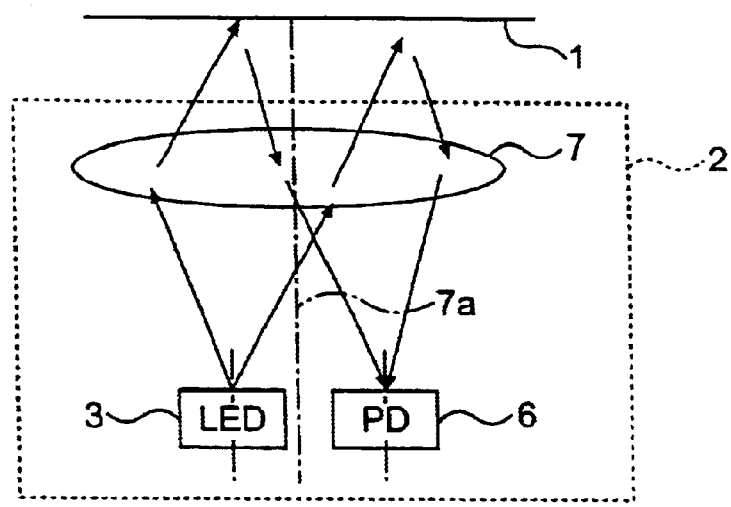
FIG. 4 is a view showing the construction of a tilt detector in accordance with a second embodiment of the present invention.

FIG. 4 is a view showing the construction of a tilt detector in accordance with a second embodiment of the present invention. In the second embodiment, a single transmitting/receiving lens 7 is provided instead of the collimating lens 4, or transmitting lens, and the condensing lens 5, or receiving lens, in the first embodiment to perform both a light transmission function and light reception function. Further, the LED 3 and PD 6 are arranged at positions shifted from an optical axis 7a of the transmitting/receiving lens 7. In other words, the LED 3 and PD 6 are arranged symmetrically on the basis of the optical axis 7a of the transmitting/receiving lens 7.

The LED 3 emits a beam of light at a position shifted from the optical axis 7a of the transmitting/receiving lens 7. For this reason, a collimated beam of light from the transmitting/receiving lens 7 is transmitted to the recording surface of the optical disc 1 not in parallel with the optical axis 7a of the lens 7 but angularly to the axis 7a. This angular beam of light is reflected from the recording surface of the optical disc 1 and then transmitted back to the transmitting/receiving lens 7. The collimated beam returned to the transmitting/receiving lens 7, which has an angle to the optical axis 7a of the lens 7, is condensed by the lens 7 and then incident on the PD 6 which is positioned symmetrically with the LED 3 on the basis of the optical axis 7a. In this embodiment, the operation based on the tilt and distance variation of the optical disc 1 is performed in the same manner as the first embodiment and a description thereof will thus be omitted.

Figure 5:
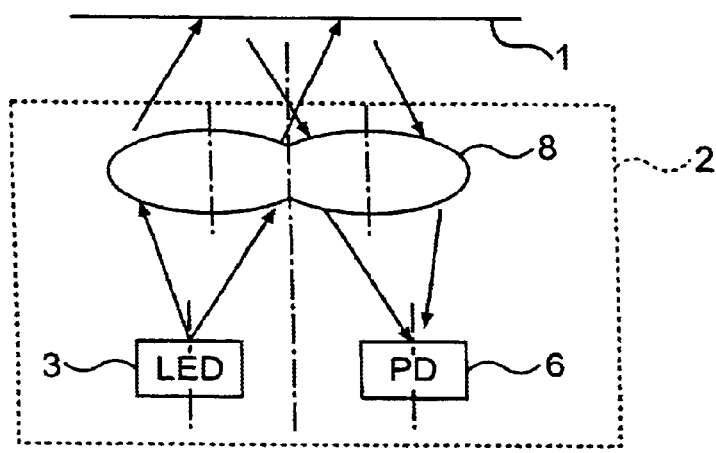
FIG. 5 is a view showing the construction of a tilt detector in accordance with a third embodiment of the present invention.
Figure 6:
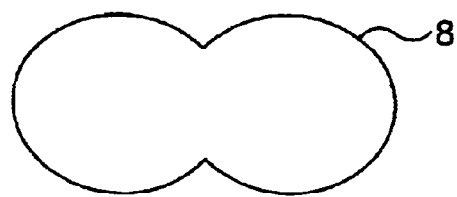
FIG. 6 is a plan view of a transmitting/receiving lens in accordance with the third embodiment of the present invention.

Next, a third embodiment of the present invention will be described with reference to FIG. 5. In this embodiment, the tilt detector comprises a transmitting/receiving lens 8 having two centers of curvature. FIG. 6 is a plan view of the transmitting/receiving lens 8 in FIG. 5. In the second embodiment, a greater distance between the LED 3 and the PD 6 results in an increase in thickness of the transmitting/receiving lens 7 and in turn an increase in size of the tilt detector 2. In this regard, the use of the transmitting/receiving lens 8 with the two centers of curvature as in the third embodiment has the effect of making the thickness of the lens small.

Figure 7:
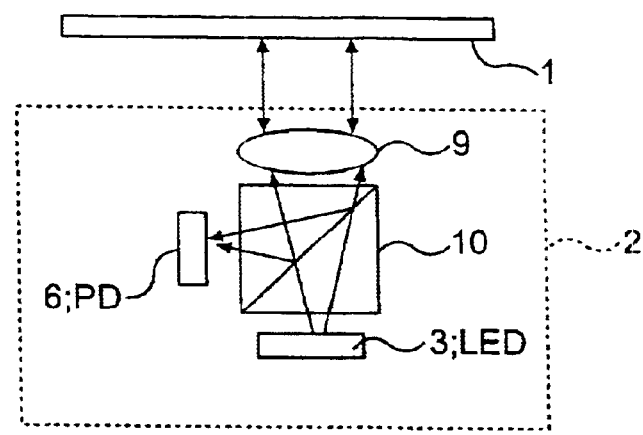
FIG. 7 is a view showing the construction of a tilt detector in accordance with a fourth embodiment of the present invention.

FIG. 7 is a view showing the construction of a tilt detector in accordance with a fourth embodiment of the present invention. In this embodiment, the LED 3 is arranged on an optical axis of a transmitting/receiving lens 9. Further, a beam splitter 10 is positioned between the transmitting/receiving lens 9 and the LED 3, and the receiving PD 6 is positioned adjacent to the side of the beam splitter 10.

The operation of the fourth embodiment of this invention is performed in the following manner. First, the LED 3 emits a divergent beam of light, which is then transmitted to the transmitting/receiving lens 9 through the beam splitter 10. Thereafter, a collimated beam of light from the transmitting/receiving lens 9 is transmitted to the recording surface of the optical disc 1 in parallel with the optical axis of the lens 9 and then reflected from the recording surface. The reflected beam of light is transmitted back to the transmitting/receiving lens 9 along the same optical path as the transmission to the recording surface of the optical disc 1. The reflected beam of light transmitted back to the transmitting/receiving lens 9 is condensed by the lens 9, turned by 90° by the beam splitter 10 and then incident on the PD 6. Because a collimated beam of light is directed onto the recording surface of the optical disc 1, reflected from the recording surface and then received by the PD 6 in the above manner, the operation based on the tilt and distance variation of the optical disc 1 is performed in the same manner as the first to third embodiments.

Figure 8A:
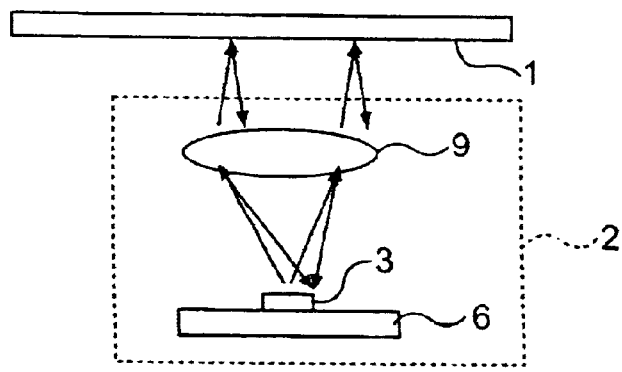
FIG. 8 is a view showing the construction of a tilt detector in accordance with a fifth embodiment of the present invention.
Figure 8B:
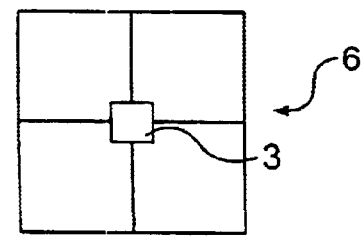
Figure 9:
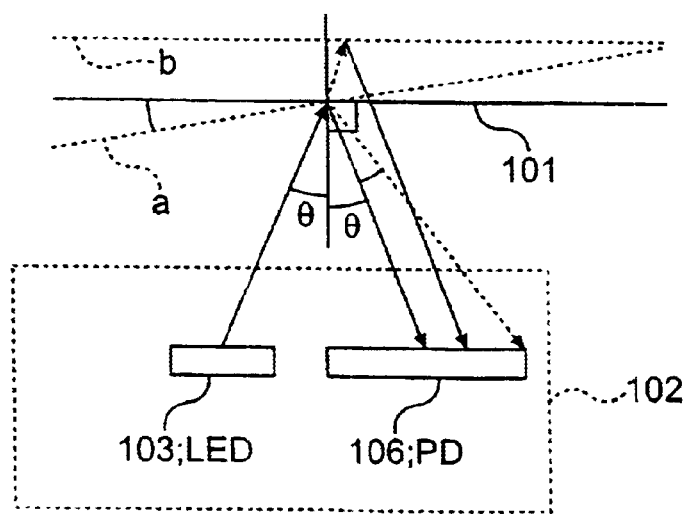
FIG. 9 is a view showing the construction of a conventional tilt detector.

Next, a fifth embodiment of the present invention will be described with reference to FIG. 8. In this embodiment, the LED 3 is positioned on the center of the PD 6. The operation of the fifth embodiment of this invention is performed in the following manner. First, the LED 3 emits a divergent beam of light, which is then collimated by the transmitting/receiving lens 9, transmitted to the recording surface of the optical disc 1 and reflected from the recording surface. The reflected beam of light is transmitted back to the transmitting/receiving lens 9, condensed by the lens 9 and then received by the PD 6. The operation based on the tilt and distance variation of the optical disc 1 is performed in the same manner as the first to fourth embodiments.

As apparent from the above description, according to the present invention, a detected value is subjected to no effect from variations in distance between the tilt detector and the recording surface of the optical disc. Therefore, only a desired tilt amount can be detected at a high degree of precision.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tilt detector for detecting a tilt of a recording surface of an optical disc, comprising:

light emitting means for emitting a divergent beam of light to be incident on said recording surface of said optical disc;

a collimating lens for collimating the divergent beam of light emitted from said light emitting means and directing the collimated beam of light onto said recording surface of said optical disc;

a condensing lens for condensing the collimated beam of light from said collimating lens, directed onto said recording surface of said optical disc and then reflected from said recording surface;

light receiving means for receiving said collimated beam of light condensed by said condensing lens and detecting the centroid of the intensity of the received beam of light, said light receiving means including a receiving surface partitioned into a plurality of areas for receiving said collimated beam of light condensed by said condensing lens, wherein said collimating lens and condensing lens constitute a single transmitting and receiving lens, and wherein said light emitting means and light receiving means are arranged symmetrically on the basis of an optical axis of said transmitting and receiving lens.

2. The tilt detector as set forth in claim 1, wherein said light emitting means and light receiving means are arranged on an optical axis of said transmitting and receiving lens.

3. The tilt detector as set forth in claim 1, wherein said transmitting and receiving lens has two centers of curvature.

* * * * *